United States Patent
Zhai

(10) Patent No.: US 9,031,321 B2
(45) Date of Patent: May 12, 2015

(54) CONTENT ADAPTIVE EDGE AND DETAIL ENHANCEMENT FOR IMAGE AND VIDEO PROCESSING

(71) Applicant: Texas Instruments Incorporated, Dallas, TX (US)

(72) Inventor: Fan Zhai, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 14/285,765

(22) Filed: May 23, 2014

(65) Prior Publication Data

US 2014/0254932 A1    Sep. 11, 2014

Related U.S. Application Data

(62) Division of application No. 13/685,997, filed on Nov. 27, 2012, now Pat. No. 8,805,114.

(51) Int. Cl.
*G06K 9/00* (2006.01)
*G06T 5/20* (2006.01)
*G06T 5/00* (2006.01)

(52) U.S. Cl.
CPC . *G06T 5/20* (2013.01); *G06T 5/007* (2013.01); *G06T 5/003* (2013.01); *G06T 5/008* (2013.01); *G06T 2207/20032* (2013.01); *G06T 2207/20192* (2013.01)

(58) Field of Classification Search
CPC ............... G06T 2207/20192; G06T 5/003; G06T 2200/12; H04N 5/142
USPC ......... 382/162, 167, 232, 233, 240, 262, 263, 382/264, 265, 266, 274, 276, 281; 358/518, 358/520, 521, 523; 348/625, 117, 581
See application file for complete search history.

(56) References Cited

U.S. PATENT DOCUMENTS

| | | | |
|---|---|---|---|
| 8,761,537 B2 * | 6/2014 | Wallace | 382/266 |
| 2005/0008251 A1 * | 1/2005 | Chiang | 382/266 |
| 2010/0177249 A1 * | 7/2010 | Ali | 348/625 |

* cited by examiner

*Primary Examiner* — Ali Bayat
(74) *Attorney, Agent, or Firm* — Robert D. Marshall, Jr.; Frank D. Cimino

(57) ABSTRACT

A content-adaptive edge and detail enhancement apparatus is described for image/video processing. Both 2D peaking and LTI/CTI are used in sharpening pictures. Image analysis is performed to generate a blending factor to control the use of the two peaking techniques. The strength or likelihood of edges or transitions is measured and such a strength or likelihood measurement will be transformed into the blending factor controlling the blending of the LTI/CTI and peaking outputs.

6 Claims, 4 Drawing Sheets

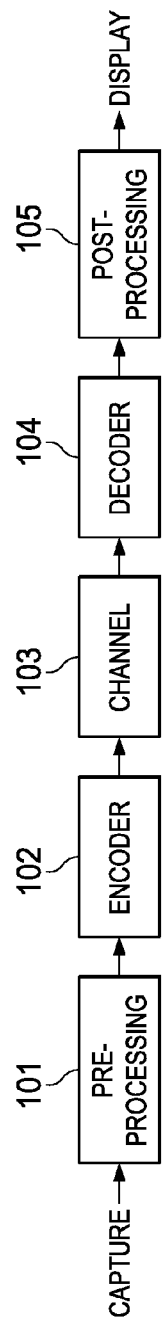
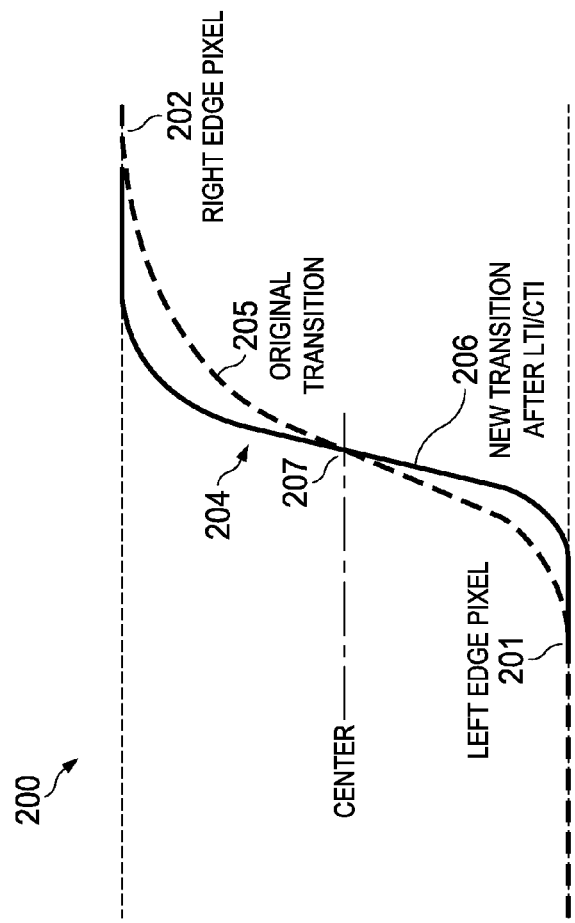

CONTENT ADAPTIVE EDGE AND DETAIL ENHANCEMENT FOR IMAGE AND VIDEO PROCESSING

This application is a divisional of U.S. patent application Ser. No. 13/685,997 filed Nov. 27, 2012.

TECHNICAL FIELD OF THE INVENTION

The technical field of this invention is digital video processing.

BACKGROUND OF THE INVENTION

When SD (Standard Definition) video is scaled to HD (High Definition) resolution, video images tend to look blurred. Video/image sharpness may also get lost due to the encoding and a variety of processing such as noise reduction, de-ringing, or de-blocking. Edge and Detail enhancement (EDE) is typically used to improve the image resolution and perceived sharpness by recovering the lost high frequency information or boosting the high frequency information.

LTI/CTI (Luminance Transient Improvement and Chrominance Transient Improvement) and peaking are both techniques aiming at improving image sharpness. LTI (CTI) typically steepens the Luma/Chroma transition slope by shrinking the width of the transients or moving the pixels in the slope transitions towards the edge center. The peaking filters usually use a linear filter (typically an FIR filter) plus the clipping and coring techniques to boost the high frequency signals. So peaking is usually a linear technique (except for the clipping and coring part) for EDE, and LTI/CTI are nonlinear techniques. Note that peaking is to amplify the high frequency information of the original signals, while LTI (CTI) may recreate the high frequency information to make pictures look sharper. So special care needs to be taken care of when LTI/CTI is used, as it is more likely to introduce unexpected artifacts.

SUMMARY OF THE INVENTION

A content-adaptive edge and detail enhancement algorithm and implementation for image/video processing. LTI/CTI and peaking are commonly used edge and detail enhancement techniques but each has its own pros and cons on different type of content. This invention describes the creation of a mask through image analysis to control the use of LTI/CTI and peaking techniques. Also included is a content-adaptive negative coring step helping to reduce the noise on the flat areas without sacrifices on the edge and detail enhancement on the texture areas. To improve the LTI/CTI quality by avoiding causing too strong transitions or false contours on human faces, a skin tone detection module is employed to control the LTI/CTI gain.

BRIEF DESCRIPTION OF THE DRAWINGS

These and other aspects of this invention are illustrated in the drawings, in which:

FIG. 1 illustrates a typical video communications system;
FIG. 2 illustrates the LTI/CTI operation.

DETAILED DESCRIPTION OF PREFERRED EMBODIMENTS

Figure 3:
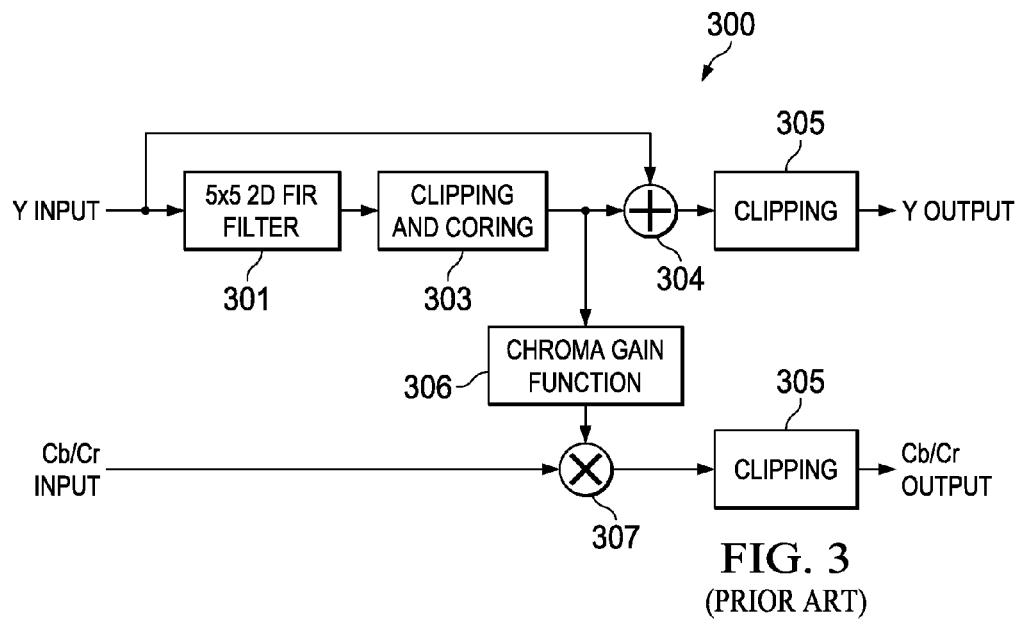
FIG. 3 shows a block diagram for 2D peaking.

FIG. 1 shows a typical video communication system where the source video signal undergoes a preprocessing step 101 before being encoded in 102. The encoding step may also include video compression such as MPEG. After the encoding step, the signal is transmitted through a variety of possible communication channels 103 such as cable, fiber optics, satellite or direct broadcast. At the receiving end the signal is decoded and decompressed in step 104, then undergoes post processing in 105 before being displayed. The invention described may be implemented either in the preprocessing or in the post processing operation.

LTI/CTI can be implemented in many ways [OHA, OTO, MIL, HE-SHARP]. For example, in one implementation [OHA], a delay modulation-based method is used for enhancing the color sharpness of a chrominance signal by increasing the steepness of color edges without ringing. The method is based on a median logic circuit using three signals, and selects values from these three signals to provide an output signal that has steep color edges. Among the three signals, one is the non-processed input signal, one is a twice delayed input signal, and the third is the derivative of the once delayed input signal. The method is simple and usually performs very well for clear transitions. The drawback is its sensitivity to noise. In addition, in a digital image, the edge pixels and edge center do not necessarily fall on the pixel lattice. This uncertainty will likely cause irregularity within an image and jitters from image to image in a video after the enhancement.

In another implementation [OTO], it looks for the horizontal transition by firstly locating the left edge pixel 201, the center pixel 207, and the right edge pixel 202. It then shrinks the transition by moving the two edges towards the center. For example, as shown in FIG. 2, after the locations of the two edge pixels 201 and 202 and center pixel 207 have been identified, we can decrease the values of the pixels between the left edge pixel and the center pixel, and the amount being decreased is proportional to the distance between the pixel being processed and the center pixel. For the pixels between the center pixel and the right edge pixel, the values will be increased with the amount proportional to the distance between the pixel being processed and the center pixel. Equivalently, the pixels on the left of the center pixel will be pulled down and the pixels on the right of the center pixel will be moved up. As a result the new transition curve 204 will be generated. Compared to the original transition 205, the new transition 206 has been clearly shrunk and the edge is steeper than the original. similarly to the method in [OHA], when the edge or the edge center is not located at the pixel lattice, jitters may present from image to image after the enhancement.

In [HE-SHARP], the system employs a similar method for edge enhancement: finding the edge pixel and edge center, and then moving the pixels within the transition towards the center. But it improves the quality by detecting the edge centers at the sub-pixel level. After the edge center pixel is detected, it calculates signal values on the shifted lattice by using a linear interpolation filter, followed by shifting pixels on each side of the edge center towards the edge center on the shifted sampling lattices, and calculating edge corrected signal values on the original sampling lattices by using linear interpolation filters.

One of the most common methods for peaking implementation is to use a 2D FIR filter followed by a clipping and coring function, as shown in. FIG. 3 [OTO]. The 2D FIR filter 301 typically is a band-pass or high-pass filter. After the filtering, the mid to high frequency information derived from the input signal is added to the original signal in 304. As a result, the high frequency information gets amplified leading to sharper pictures with more details. Usually the peaking filter output will go through a clipping and coring function 303 before it is added to the original signal. The reason why we need coring is that when the peaking filter output is small, it usually means the corresponding area has little high frequency information that needs to be amplified. The area may contain some noise as well. The reason why we need clipping is that when the peaking filter output is very large, it usually means the corresponding area already has very strong edges or transitions, so we may not want to further amplify it in order to avoid causing too much overshoots or undershoots. The sum of the clipping and coring output and the original signal need to go to another clipping function 305, which clips the value to the valid range of the Luma/Chroma signal (e.g., [0, 1023] for 10-bit Luma and [−512, 511] for 10-bit Chroma).

Note that Chroma can also be processed similarly to Luma. But because Chroma information is usually not as critical as Luma in terms of the impact on visual quality, it can be processed differently in order to reduce complexity. As shown in FIG. 3, the clipping and coring output from the Luma channel is used to control the gain function 306 and 307 for the Chroma peaking. The Chroma gain function shown in the figure usually is also user programmable.

Although LTI (CTI) and peaking can both sharpen pictures, it is widely known that the two techniques are only suitable for different type of image content [BLU, HE-EDGE]. For example, for the areas where strong edges are present (such as object boundaries), LTI (CTI) techniques are usually preferred. LTI/CTI technologies, however, generate sharp transients without any undershoots and overshoots. On the other hand, it can be seen that 2D peaking gives us more details on the content without strong transitions. This is because LTI/CTI usually is not effective on the areas where there is no clear edge or transition.

In addition, for the areas where relatively soft transitions are present, peaking is usually preferred, as LTI (CTI) tends to lead to sharp transition or false contour effect. This is especially critical on some particular content such as human face.

Given the above observations, instead of choosing to use either LTI/CTI or 2D peaking technologies to process a picture, a better way to achieve higher image/video processing quality is to enable image content analysis and use it to adaptively select the type of peaking filters in accordance to the content type. In [HE-EDGE], such a system has been developed, where the strength of LTI and peaking are adaptively selected according to an edge detector, which is to measure the edge frequency. When a soft edge is detected, the peaking unit will be employed, while LTI will be enabled with shaper edge is detected. One disadvantage of this system is the hard switch from LTI to peaking usually will cause sudden changes during the transitions, and in addition, such hard switch is not robust to noise. Secondly, the edge detection is based on the calculation of the first, the second, and the third derivatives. Although low-pass filter has been employed in the prior art, such calculations are still very sensitive to noise. In addition, in complex texture areas, no clear edge will be detected which may cause ambiguity as to which type of peaking mechanism should be used.

In this invention, a method is shown that can adaptively choose whether LTI/CTI or peaking should be used for image/video edge and detail enhancement according to the image content. The two mechanisms are combined in a soft-switch manner. That is, LTI/CTI and peaking outputs will be blended according to the edge transition strength. A different type of edge strength detection method is employed which is much simpler but more reliable and effective when used together with the soft-switch method. The LTI/CTI and peaking algorithms themselves are not the core of this invention, as they can be any implementation as long as they achieve the desired level of quality. Without generality, we use the implementations in [OTO] when describing this invention.

Figure 4:
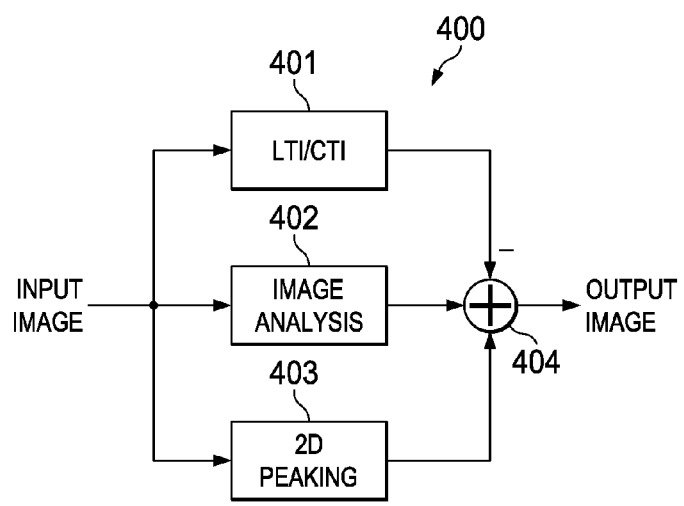
FIG. 4 shows the basic steps described in this invention.

The top-level block diagram of the invention is illustrated in FIG. 4. As shown in the figure, there are three major components: LTI/CTI 401, 2D peaking 404, and image analysis 402. The LTI/CTI module outputs Y_ti. The 2D peaking module outputs Y_pk. The image analysis module returns a blending factor, a, ranging from 0 to 1. The final output is a blender 404 output, Y=a*Y_ti+(1−a)*Y_pk.

Note again that this invention is not limited to a particular implementation of LTI/CTI or peaking filter, as long as they achieve the desired level of quality. We next discuss each component in detail.

Given the complexity of image content, we need a more reliable mechanism to detect the edges or edge frequencies than that in [HE-EDGE]. Note that we will not use this information to make hard decisions on whether peaking or LTI/CTI should be used on each pixel. Instead we will measure the strength or likelihood of edges or transitions and such a strength or likelihood measurement will be transformed into a blender factor controlling the blending of the LTI/CTI and peaking outputs. In this invention, we use a 4×4 Walsh-Hadamard transform due to its low complexity and effectiveness. The transform coefficients are given as below:

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

Different transform coefficients indicate the amount of different frequency characteristics of the signal, which gives us a lot of flexibility in detecting the edge and edge frequencies (i.e., differentiating between soft edges and sharp edges). It is also a good indicator of strong edges versus busy textures by comparing the amount of low frequency transform coefficients and high frequency transform coefficients. In addition, the transform coefficients provide the separate information for the horizontal, vertical, and diagonal frequencies, which may be very useful in some circumstances. For example, if only horizontal LTI/CTI is going to be implemented, we only need to measure the horizontal edge frequency. With the Walsh-Hadamard transform coefficients, we can easily select coefficients (1,2), (1,3), and (1,4) for the measurement and ignore (2,1), (3,1), and (4,1), which indicate the vertical frequencies. Again note that the invention is not limited to the use of Walsh-Hadamard transform. Any similar transform such as DFT or DCT or wavelet can serve the purpose as well, although they might be more computationally complicated. Simpler edge measurement operators such as the Sobel operator can also be used to some degree, although it is not as capable as Walsh-Hadamard transform in terms of the capability to detect high frequency information in all different directions, and as a result lacks the flexibilities mentioned above.

We first apply the Walsh-Hadamard transform filter to the Luminance channel of each image to create a mask. This mask gives us a confidence level as to if we are dealing with strong transitions or soft transitions. Low values suggest soft transitions, while high values suggest strong transitions.

When creating the mask, we take the absolute value of the (1,2), (2,1), (1,3), (3,1), and (2,2) transform coefficients as shown in line 4 to 6 of the Matlab-based pseudo codes in Table 1. The belief is that for soft transition areas, the high frequency components will be relatively small, while for strong transition areas, one of these bins will be extremely large. The use of the transform results in a reasonable mask in differentiating between soft and strong transitions. The reason why we discard the other coefficients is because the other coefficients except the DC component correspond to the higher frequencies, which usually are not a good indicator for clear and strong edges. We then scale, clip, and quantize the sum into the range of [0, 64] for easy hardware implementation of the blender. Finally, we apply a 3×3 median filter to improve the consistency and make the result more robust to noise.

TABLE 1

| 1 | wht2d = wht_2D(X); | % Walsh-Hadamard transform |
|---|---|---|
| 2 | wht2dabs = abs(wht2d); | % Take absolute values |
| 3 | | |
| 4 | whtSum = | |

TABLE 1-continued

| 5 | wht2dabs(:,:,1,2)+wht2dabs(:,:,2,1)+wht2dabs(:,:,1,3) | |
|---|---|---|
| 6 | +wht2dabs(:,:,3,1)+wht2dabs(:,:,2,2); | % Select coefficients |
| 7 | | |
| 8 | whtSum = whtSum / 2; | |
| 9 | | |
| 10 | whtSum (whtSum >256)=256; | % clip all above 256; |
| 11 | quantwhtSum = round(whtSum /4); | % quantize to [0, 64] |
| 12 | whtSum_med = medfilt2(quantwhtSum, [3 3]); | % median filtering |

The masks of the image analysis module clearly captures the strong edges indicated by bright areas. The areas with busy texture without clear edges such as bushes, meadow, water surface, and the stairs have quite small values in the mask, causing the blender favoring towards the peaking output on these areas.

Figure 5:
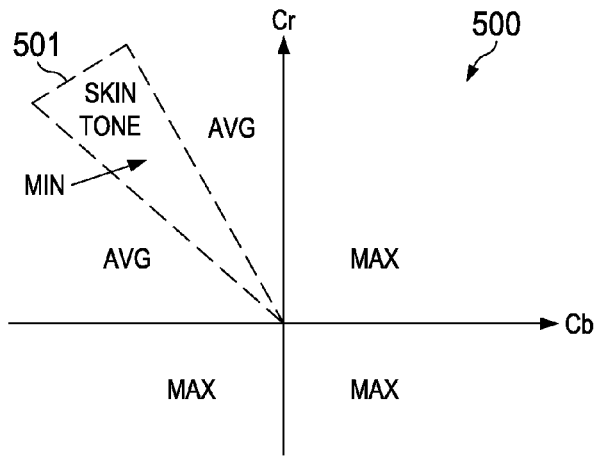
FIG. 5 illustrates the method for detecting skin tones.

When LTI/CTI is performed on the areas of human faces that have relatively strong transitions, it will lead to sharp transition or false contour, which is very annoying as human eyes are very sensitive to such artifacts on human faces. This cannot be easily fixed in the image analysis module since there are indeed sharp transitions on these areas. Recognizing such issue only occurs on human skin, we employ skin tone detection and use it to control the strength of LTI/CTI In this invention, we use a simple skin tone detection, which is based on the relationship of Cb and Cr components for a video image in the YCbCr format, as shown in FIG. 5. It checks the relationship of U and V components for each pixel. When skin tone is detected, the minimum gain is then used in the LTI/CTI operation.

The C codes used to implement skin tone detection are given in Table 2.

TABLE 2

| 1 | const_mid = 128; | // Constant, assuming 8-bit data |
|---|---|---|
| 2 | minc_thr = 10; | // small constant |
| 3 | | |
| 4 | condition0 = | |
| 5 | (cb<const_mid-minc_thr)&(cr>const_mid+minc_thr); | //(cb<0)&(cr>0) |
| 6 | condition1 = | |
| 7 | ((cr+(cb>>1))<(const_mid+(const_mid>>1))); | //(cr<-cb/2) |
| 8 | condition2 = | |
| 9 | (cb+cr<(const_mid<<1)); | //(cr<-cb) |
| 10 | condition3 = | |
| 11 | ((cr+(cb<<1))<(const_mid+(const_mid<<1))); | //(cr<-2*cb) |
| 12 | | |
| 13 | // decide the masks for the four five regions | |
| 14 | mask0 = !condition0; | |
| 15 | mask1 = (condition0 & condition1); | |
| 16 | mask2 = (condition0 & !condition1 & condition2); | |
| 17 | mask3 = (condition0 & !condition2 & condition3); | |
| 18 | mask4 = condition0 & !condition3; | |
| 19 | | |
| 20 | // decide the LTI gain due to skin tone detection | |
| 21 | if (mask0==1) | |
| 22 |     gain_skintone = max_LTI_gain; | |
| 23 | else if (mask1==1) | |
| 24 |     gain_skintone = (max_LTI_gain >>1); | |
| 25 | else if (mask2==1) | |
| 26 |     gain_skintone = (max_LTI_gain >>2); | |
| 27 | else if (mask3==1) | |
| 28 |     gain_skintone = (max_LTI_gain >>3); | |
| 29 | else if (mask4==1) | |
| 30 |     gain_skintone = (max_LTI_gain >>1); | |
| 31 | else | |
| 32 |     gain_skintone = 0; | |

In this implementation, mask0 in Line 14 indicates quadrants 1, 3, and 4, and Line 15-18 indicates four regions in quadrant 2, which correspond to different levels of skin tone. As shown from Line 21-32, different regions of skin tone lead to different amount of LTI gains. The constant minc_thr is used because when the color difference values Cb and Cr are very close to 128, they should be excluded from skin tone detection. The final selected output, gain_skintone, will be used in LTI/CTI to control the gain there.

Note that more regions in quadrant 2 can be used to provide a finer control of the LTI gains, though it comes with increased complexity. Also note that there is no limitation on which skin tone detection scheme should be used. The scheme described in this subsection is just one implementation of an embodiment of this invention.

One of the potential drawbacks of peaking is that noise tends to get amplified at the same time when the edge and details are enhanced, as noise usually has a very wide range of spectrum. For example, white Gaussian noise has a uniform distribution across the whole range of spectrum from DC to ½*fs, where fs is the sampling frequency. The good news is that due to the mask effects, the human psycho-visual perception is not sensitive to the noise at busy texture areas, but to the relatively flat areas. Note that the image analysis module described above can also generate a mask indicating which areas are flat or busy. The common practice is to set the peaking filter strength to the minimum value for the flat areas in order not to amply noise.

Figure 6:
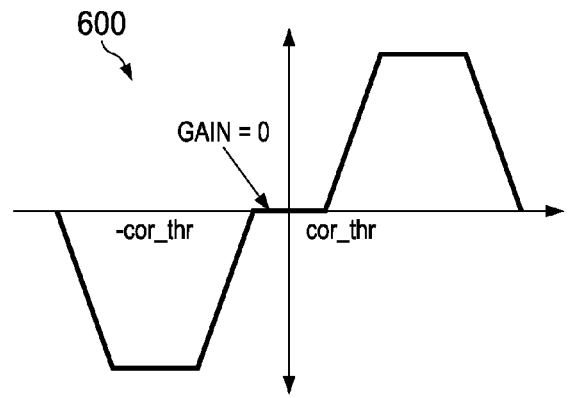
FIG. 6 shows clipping and coring with positive coring.

In FIG. 6, a conventional clipping and coring function is shown, where the input is the output from the peaking filter. In a conventional clipping and coring function, when the input is small and within the range of [−cor_thr, cor_thr], where cor_thr is the coring threshold, the output usually is set to 0. Mathematically, we have $$peak\_conv\_cor\_out = sign(peak\_filt\_Y)* \\ max(abs(peak\_filt\_Y) - cor\_thr, 0)$$

where peak_filt_Y is the output from the peaking filter, and peak_conv_cor_out is the conventional coring output.

Note that as shown in FIG. 3, the output of the clipping and coring function is added to the original signal. So this means if there is a very small amount of high-frequency components in some area, peaking will not be applied. In addition to the conventional coring, in this invention, we move one step further. We apply negative coring to the flat areas to perform noise reduction in order to further improve the image quality.

Figure 7:
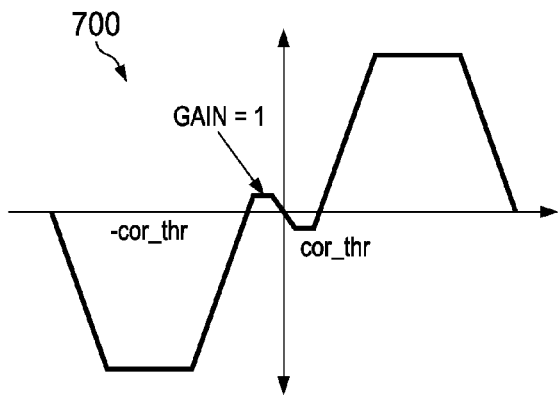
FIG. 7 shows clipping and coring with negative coring.

As shown in FIG. 7, when the peaking filter output is small, we will subtract the output from the original signal to compress the high frequency components in such areas, leading to noise reductions on these flat areas. Mathematically we have:

$$peak\_neg\_cor\_out = sign(peak\_filt\_Y)* \\ max(abs(peak\_filt\_Y) - \\ cor\_thr, -neg\_cor\_gain*abs(peak\_filt\_Y))$$

where neg_cor_gain is the gain parameter and usually is set to 1, and peak_neg_cor_out is the negative coring output.

Note that in a signal processing pipe, noise reduction usually is an independent module due to its importance. The negative coring here in the peaking filter path is rather soft compared to the noise reduction module where the whole purpose is to reduce the noise existing in image/video. By applying this content-adaptive negative coring, we not only enhance the high frequency information of the edge and details areas, but also reduce noise in the flat areas, thus leading to the best subjective visual quality.

Figure 8:
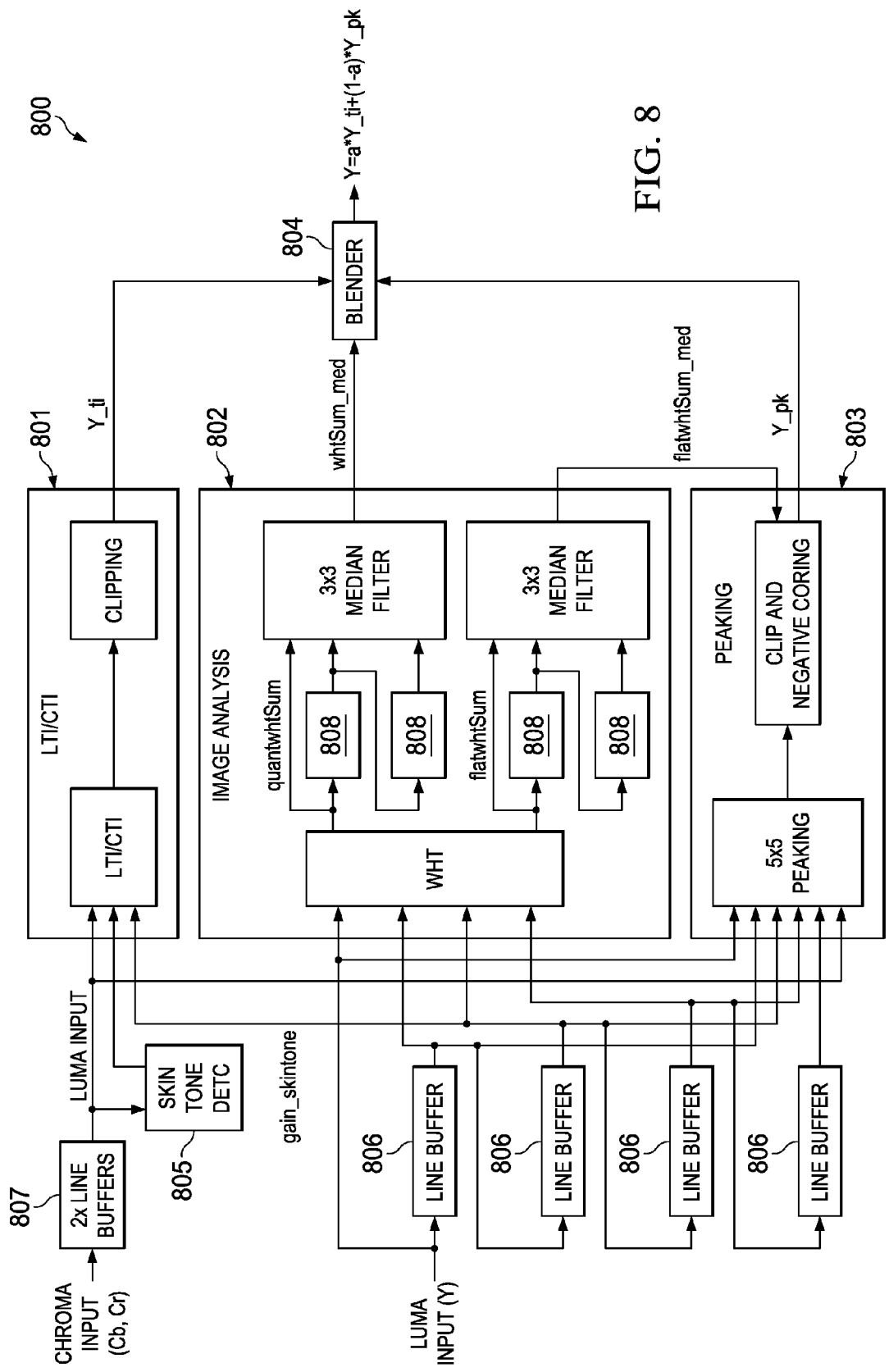
FIG. 8 shows one embodiment of the invention.

FIG. 8 illustrates one embodiment of this invention. The same as the top level block diagram as shown in FIG. 4, the major components are LTI/CTI 801, image analysis 802, peaking 803 and blender 804. Both luma and chroma inputs are sent to LTI/CTI and peaking modules for processing. The output from the LTI/CTI module is Y_ti, which denotes both luma and chroma signals for simplicity. The peaking module 803 can be implemented similarly to [OTO] as well, as described earlier. The peaking module output is Y_pk, which again denotes both luma and chroma signals for simplicity. The input to the image analysis module 802 is luma only. This module has two outputs. One is the regular Walsh-Hadamard output, whtSum_med, given in Table 1.

This signal denotes the edge strength and is sent to blender 804 for controlling the blending of the LTI/CTI and peaking outputs. As the range of whtSum_med is from 0 to 64, the hardware realization of the blender can be described as:

$$Y = (whtSum\_med*Y\_ti + (64 - whtSum\_med)* \\ Y\_pk) >> 6$$

The second output from the image analysis module is flat-whtSum_med, which denotes the flatness of the image content. This is obtained similarly to how whtSum_med is obtained. The difference lies in which transform coefficients are included in the calculation. For measuring the flatness, we include all the transform coefficients except the DC component. The flatness signal is sent to the clipping and negative coring part of the peaking module 803 to control the gain of negative coring.

The skin tone detection module 805 takes chroma signals as inputs, and it is used to help improve the LTI/CTI quality by reducing the LTI/CTI gain when skin tone is detected.

The input video pixel values are read from the source at raster-scan order, as this is the most bandwidth-efficient way to implement this invention. The data will then be stored on the on-chip line buffers, each of which works as a FIFO. As shown in FIG. 8, there are four line buffers used in this implementation. When the data is read from external source at raster-scan order, it goes into the FIFOs. Note that the input pixel together with the outputs of the four line buffers represent five pixels with one line apart. That is, these five pixels are vertically aligned. Such an implementation can support vertical operations with an up to 5-tap filter.

The line buffers also provide pixel values used by the image analysis module 802, as this module uses a 4×4 window for the Walsh-Hadamard transform. As shown in the figure, the inputs to the image analysis module are four vertically aligned luma pixels. The four luma line buffers used to feed data to the peaking modules introduce 2-line delay. In order to match such delay in the chroma channel, the chroma input signals first goes to a 2× line buffer before it is sent to the LTI/CTI and peaking modules for processing. In order to perform 3×3 median filtering in the image analysis module, four line buffers 808 are needed as shown in the figure. Note that different from the other line buffers, these four line buffers used for the median filter contain the data for the sum of the Walsh-Hadamard transform coefficients.

What is claimed is:

1. A content adaptive edge and detail enhancement for image processing apparatus comprising:
   a first input receiving chroma signals of an input image;
   a second input receiving luminance signals of the input image;
   a combined LTI/CTS (Luminance Transient Improvement/Chrominance Transient Improvement) module connected to said first input and said second input, said combined LTI/CTS module applying LTI and CTS to the image and generating a output signal Y_ti;
   a peaking module connected to said first input and said second input, said peaking module amplifying spatial high frequencies in the image and generating an output signal Y_pk;
   an image analysis module connected to said second input, said image analysis module analyzing the image to determine strength of edge transitions present in the image and generating an output blending factor a, ranging from 0 to 1, corresponding to the determined strength of edge transitions; and
   a blending module receiving Y_ti from said LTI/CTS module, Y_pk from said peaking module and blending factor a from said image analysis module and generating a blended output Y, where $$Y = a*Y\_ti + (1 \times a)*Y\_pk.$$

2. The apparatus of claim 1, further comprising:
   a skin tone detection module connected to said first input, said skin tone detection module detecting chroma signals indicative of the color of human skin and generating an output indicating when skin tone is detected; and wherein said combined LTI/CTS module is further connected to said skin tone detection module and further operates to select a minimum gain when said output of said skin tone detection module indicates skin tone is detected.

3. The apparatus of claim 1, wherein:

said image analysis module further determines flat regions and generates a flatness signal corresponding to image flatness; and said peaking module further includes a clipping and negative coring module having an input receiving a peak filtered signal and limiting peaks in said peak filtered signal and amplifying low signal portions of said peak filtered signal, said clipping and negative coring module receiving said flatness signal from said image analysis module and further operates to select a minimum gain when said flatness signal indicates image flatness.

4. A content adaptive edge and detail enhancement for image processing apparatus comprising:

a first input receiving chroma signals of an input image;

a chroma signal buffer having an input connected to said first input and an output delayed by two lines of the image;

a second input receiving luminance signals of the input video;

a first luma signal buffer having an input connected to said second input and an output delayed by one line of the image;

a second luma signal buffer having an input connected to said output of said first luma signal buffer and an output delayed by one line of the image;

a third luma signal buffer having an input connected to said output of said second luma signal buffer and an output delayed by one line of the image;

a fourth luma signal buffer having an input connected to said output of said third luma signal buffer and an output delayed by one line of the image;

a combined LTI/CTS (Luminance Transient Improvement/Chrominance Transient Improvement) module connected to said output of said chroma signal buffer and said output of said second luma signal buffer, said combined LTI/CTS module applying LTI and CTS to the image and generating a output signal Y_ti;

a peaking module connected to said output of said chroma buffer, said second input, said output of said first luma buffer, said output of said second luma buffer, said output of third first luma buffer and said output of said fourth luma buffer, said peaking module performing a 5×5 two dimensional finite impulse response filter amplifying spatial high frequencies in the image and generating an output signal Y_pk;

an image analysis module connected to said second input, said output of said first luma buffer, said output of said second luma buffer and said output of third first luma buffer, said image analysis module including a 4×4 Walsh-Hadamard transform generating a first mask signal indicating strong transitions in the image signal, a fifth luma signal buffer having an input receiving said first mask signal of said 4×4 Walsh-Hadamard transform and an output delayed by one line of the image, a sixth luma signal buffer having an input connected to said output of said fifth luma signal buffer and an output delayed by one line of the image, and a 3×3 median filter connected to said Walsh-Hadamard transform, said fifth luma signal buffer and said sixth luma signal buffer, said 3×3 median filter generating a median filtered first mask signal whtSum_med ranging from 0 to 64; and a blending module receiving Y_ti from said LTI/CTS module, Y_pk from said peaking module and blending factor a from said image analysis module and generating a blended output Y, where $Y=(\text{whtSum\_med}*Y\_ti+(1-\text{whtSum\_med})*Y\_pk)>>6.$ 5. The apparatus of claim 4, further comprising:

a skin tone detection module connected to said output of said chroma signal buffer, said skin tone detection module detecting chroma signals indicative of the color of human skin and generating an output indicating when skin tone is detected; and wherein said combined LTI/CTS module is further connected to said skin tone detection module and further operates to select a minimum gain when said output of said skin tone detection module indicates skin tone is detected.

6. The apparatus of claim 4, wherein:

said image analysis module wherein said 4×4 Walsh Hadamard transform further generating a second mask signal indicating flat regions in the image signal;

said image analysis module further including a seventh luma signal buffer having an input receiving said second mask signal of said 4×4 Walsh-Hadamard transform and an output delayed by one line of the image, an eighth luma signal buffer having an input connected to said output of said sixth luma signal buffer and an output delayed by one line of the image, and a flatness 3×3 median filter connected to said Walsh-Hadamard transform, said seventh luma signal buffer and said eighth luma signal buffer, said 3×3 median filter generating a median filtered second mask signal; and said peaking module further includes a clipping and negative coring module having an input receiving a peak filtered signal and limiting peaks in said peak filtered signal and amplifying low signal portions of said peak filtered signal, said clipping and negative coring module receiving said median filtered second mask signal from said image analysis module and further operates to select a minimum gain when said median filtered second mask signal indicates image flatness.

* * * * *